US012807422B2

(12) United States Patent
Roell et al.

(10) Patent No.: US 12,807,422 B2
(45) Date of Patent: Nov. 24, 2026

(54) BLADE ASSEMBLY FOR SCRAPING AN ADVANCING MATERIAL CONVEYING SURFACE

(71) Applicant: ARGONICS, INC., Gwinn, MI (US)

(72) Inventors: Joseph Roell, Marquette, MI (US); Gregory Ryan Goodman, Marquette, MI (US); Justin Robert Flood, Marquette, MI (US); Ryan Paul Kangas, Negaunee, MI (US); Hans Vollenweider, Marquette, MI (US)

(73) Assignee: Argonics, Inc., Gwinn, MI (US)

( * ) Notice: Subject to any disclaimer, the term of this patent is extended or adjusted under 35 U.S.C. 154(b) by 97 days.

(21) Appl. No.: 18/947,148

(22) Filed: Nov. 14, 2024

(65) Prior Publication Data

US 2026/0131979 A1 May 14, 2026

(51) Int. Cl.
*B65G 45/12* (2006.01)
*B65G 45/16* (2006.01)

(52) U.S. Cl.
CPC .................................... *B65G 45/12* (2013.01)

(58) Field of Classification Search
None
See application file for complete search history.

(56) References Cited

U.S. PATENT DOCUMENTS

| | | | | |
|---|---|---|---|---|
| 4,953,689 A * | 9/1990 | Peterson | B65G 45/16 15/256.51 |
| 5,197,587 A * | 3/1993 | Malmberg | B65G 45/16 198/497 |
| 5,979,638 A * | 11/1999 | Wiggins | B65G 45/12 198/497 |
| 6,182,816 B1 * | 2/2001 | Gibbs | B65G 45/12 198/497 |

(Continued)

FOREIGN PATENT DOCUMENTS

| | | | |
|---|---|---|---|
| BR | MU8901233 U2 * | 2/2011 | |
| BR | 202014030312 U2 * | 3/2017 | B65G 45/12 |

(Continued)

OTHER PUBLICATIONS

International Search Report issued Jan. 27, 2025, in International Application No. PCT/US2024/059163.

*Primary Examiner* — Gene O Crawford
*Assistant Examiner* — Muhammad Awais
(74) *Attorney, Agent, or Firm* — Wood, Phillips, Katz, Clark & Mortimer

(57) ABSTRACT

A blade assembly for scraping an advancing material conveying surface has a mount portion: a) configured to be engaged with at least one connector on a support; and b) at least partially embedded in a non-metal material defining a conveying surface engaging region of the blade assembly. The mount portion has a length between spaced ends and is coextensive with a width of the surface engaging region. The mount portion has a substantially fully surrounded volume, (Continued)

as viewed along the length of the mount portion, that is not filled with the non-metal material and extends over a majority of the length of the mount portion. The substantially fully surrounded volume is configured to allow air flow therewithin with the blade assembly in the operative position.

24 Claims, 4 Drawing Sheets

(56) References Cited

U.S. PATENT DOCUMENTS

| | | | | |
|---|---|---|---|---|
| 7,461,736 | B2 * | 12/2008 | Waters | B65G 45/12 198/497 |
| 8,123,022 | B2 * | 2/2012 | Mott | B65G 45/12 198/502.1 |
| 2009/0032371 | A1 * | 2/2009 | Hoessl | B65G 45/12 198/497 |
| 2010/0126832 | A1 * | 5/2010 | DeVries | B08B 1/20 264/275 |
| 2015/0274434 | A1 * | 10/2015 | DeVries | B65G 45/14 198/497 |
| 2016/0052723 | A1 * | 2/2016 | Peterson | B65G 45/16 198/497 |
| 2016/0376108 | A1 * | 12/2016 | Ma | B65G 45/16 198/499 |
| 2018/0222687 | A1 * | 8/2018 | Christian | B65G 45/12 |
| 2018/0229943 | A1 * | 8/2018 | Christian | B65G 45/12 |

FOREIGN PATENT DOCUMENTS

| | | | | | |
|---|---|---|---|---|---|
| CN | 117682286 | A | * | 3/2024 | B65G 15/00 |
| DE | 102007050744 | A1 | * | 5/2009 | B65G 45/12 |
| EP | 3741714 | A1 | * | 11/2020 | B65G 45/16 |
| GB | 2364985 | A | * | 2/2002 | B65G 45/12 |

* cited by examiner

BLADE ASSEMBLY FOR SCRAPING AN ADVANCING MATERIAL CONVEYING SURFACE

BACKGROUND OF THE INVENTION

Field of the Invention

This invention relates to cleaning blades as used to scrape an advancing surface conveying different materials and, more particularly, to a blade assembly that has a surface engaging region made from one material that is joined with a mount portion made from a different material.1

Background Art

In many different environments, endless belts are used to convey materials placed on an upwardly facing surface of the advancing belt. As but one example, these belts are used in mining operations to advance materials with different size, composition, consistency, etc., potentially over extended distances. At an end of one of the endless conveying belt units, conveying material separates from the belt and discharges for appropriate handling.

It is important that the conveying surface of the belt be substantially free of the advanced materials as it travels in a return portion of the belt path away from the discharge end so that the advanced material does not accumulate on the belt or on or around other parts of the conveying structure so as to potentially interfere with operation thereof.

The need to scrape the advancing belt at the discharge location arises for many reasons. Many materials are inherently of a nature that they tend to adhere to, and progressively accumulate on, the belt surfaces. Heat, humidity, and rain may periodically change the nature of the advancing material whereby it more aggressively adheres to the belt conveying surfaces. For example, in mining operations, some of the materials themselves are prone to becoming more adherent in nature when wet. Further, many materials generate dust and/or mix with atmospheric dust that is prone to coagulating on belt surfaces and progressively accumulating, particularly in high moisture environments.

It has long been known to use cleaning blades at belt discharge locations. The cleaning blades are commonly mounted on a support and have a cantilevered portion with a distal tip region that is biasably borne against the belt surface to effect scraping thereof as the belt advances. The assignee herein makes different blade configurations with a surface-engaging region made from a urethane material.

Urethane has excellent durability while also being able to follow some changing contours of the engaged belt surface during operation. Blades using urethane, and other non-metal material for belt surface engagement, are designed so that the surface-engaging region of the blade over time will experience wear, which ultimately necessitates replacement.

With a typical blade configuration, the non-metal material will flex under an applied load so that the portion of the blade engaging the conveying surface is biasably urged thereagainst. During operation, the non-metal portion of the blade will repetitively bend.

Since urethane, and other non-metal materials, are not optimally usable to directly connect to a support for the blade assembly, a mount portion made of metal is commonly embedded in the non-metal material and is used to connect to a cooperating component on the blade support. Aside from facilitating connection to a support, the mount portion rigidifies the non-metal material to control flexing thereof.

In engineering the non-metal scraping region and the cooperating mount portion on blade assemblies, several different design objectives are in competition.

To effectively scrape belt conveying surfaces, it is important that the free end region of the blade, made from the non-metal material, at all times be urged positively against the belt conveying surface during operation. This requires generation of a biasing force on the blade body through the metal mount portion. If the modulus of the non-metal material is not maintained at a high enough level, the blade may deform excessively whereby the distal tip region disengages from the belt, or contacts the belt with a force that is not adequate to effectively scrape the belt surface.

This is particularly a problem with long blades wherein a substantial length may be entirely unreinforced by the metal mount portion. Repetitive bending generates heat that tends to reduce the modulus of the non-metal material for both long and short blades. The longer blades present an added challenge since it may be difficult, or impossible, to maintain the required contact force between the blade, with a lowered modulus, and the advancing belt.

In a worst case, a blade repetitively flexed in a high temperature environment may become structurally compromised.

Even with certain shorter blades, this same problem may arise if the volume of the non-metal material in the mount region is not adequately reinforced by the mount portion.

It is also important that the blade mount be positively embedded in the surface-engaging material so that the surface-engaging material does not shift relative to the blade mount in use, which could compromise how the belt-engaging region engages a belt. An ineffective connection of the surface-engaging material and blade mount could cause skewing of the surface-engaging region, and in a worst case a failure resulting from separation of the surface-engaging material from the mount portion. Thus, it is necessary that the mount portion engage the surface-engaging material positively over a substantial area.

With longer blades, the design challenge is increased since there is a longer moment arm as the non-metal material bends repeatedly relative to the mount portion in operation, resulting in substantial forces tending to draw the non-metal material away from the mount portion.

While the integrity of the connection between the non-metal material and mount portion may be improved by increasing the volume of the non-metal material in which the mount portion is embedded, doing so may result in a substantial waste volume of the non-metal material. That is, when the usable non-metal portion of the blade has been worn down to the point that it must be replaced, a large amount of the non-metal material may remain attached to the mount portion. In the event the mount portion is reused, the non-metal material must be separated. Thus, a balance is always sought between having an adequate volume of the non-metal material in which the mount portion is embedded, without having a large amount of the non-metal remaining and becoming waste when the anticipated useful life of the blade assembly is ended.

Still further, a larger volume of non-metal material in the mount region, compared to the volume effectively occupied by the mount portion, may make the blade excessively deformable in the mount region, whereby performance may be compromised.

While a multitude of different blade assemblies currently exist—using different sizes and configurations of mount portions—the above challenges remain and the problems noted above are often contended with, particularly in environments that are harsh because of the nature of the conveying belt surface, the material being conveyed, and/or the environmental conditions.

SUMMARY OF THE INVENTION

In one form, the invention is directed to a blade assembly for scraping an advancing material conveying surface. The blade assembly includes a mount portion configured to be engaged with at least one connector on a support for the blade assembly to thereby maintain the blade assembly in an operative position. The mount portion is at least partially embedded in a non-metal material that defines a conveying surface engaging region of the blade assembly. The mount portion is made of a material different than the non-metal material. The mount portion has a length between spaced ends and is coextensive with a width of the conveying surface engaging region. The mount portion has a first substantially fully surrounded volume, as viewed along the length of the mount portion, that is not filled with the non-metal material. The first substantially fully surrounded volume extends over a majority of the length of the mount portion. The first substantially fully surrounded volume is configured to allow air flow therewithin with the blade assembly in the operative position.

In one form, the first substantially fully surrounded volume is bounded at least in part by a wall having a first portion with a substantial length as viewed along the length of the mount portion. The substantial length of the first wall portion has oppositely facing surfaces, with one of the oppositely facing surfaces bounding the substantially fully surrounded volume and the non-metal material formed against the other of the oppositely facing surfaces.

In one form, the substantial length of the first wall portion is substantially straight as viewed along the length of the mount portion.

In one form, the substantial length of the first wall portion is curved as viewed along the length of the mount portion.

In one form, the mount portion has a downwardly opening receptacle for the at least one connector on the support. The first substantially fully surrounded volume extends to above the downwardly opening receptacle.

In one form, the first substantially fully surrounded volume is located entirely above the downwardly opening receptacle.

In one form, the mount portion has a second substantially fully surrounded volume, as viewed along the length of the mount portion.

In one form, the mount portion has a downwardly opening receptacle for the at least one connector on the support. The second substantially fully surrounded volume is spaced at least partially to a first side of the downwardly opening receptacle as viewed along the length of the mount portion.

In one form, the mount portion has a downwardly opening receptacle for the at least one connector on the support. The entirety of the second substantially fully surrounded volume is spaced to a side of the downwardly opening receptacle as viewed along the length of the mount portion.

In one form, the mount portion has a downwardly opening receptacle for the at least one connector on the support. A majority of a height of the second substantially fully surrounded volume, as viewed along the length of the mount portion, resides below a top of the downwardly opening receptacle.

In one form, the mount portion has a third substantially fully surrounded volume spaced to a side of the downwardly opening receptacle opposite to the first side of the downwardly opening receptacle.

In one form, the material from which the mount portion is made is metal.

In one form, the first substantially fully surrounded volume is a first fully surrounded volume.

In one form, the non-metal material is not present in the first fully surrounded volume.

In one form, the first fully surrounded volume is fully surrounded by a surface made from the material from which the mount portion is made. The material from which the mount portion is made is metal.

In one form, the mount portion has a constant shape fully between the spaced ends of the mount portion as viewed along the length of the mount portion.

In one form, the non-metal material defining the conveying surface engaging region is urethane.

In one form, the first substantially fully surrounded volume extends fully between the spaced ends of the mount portion so as to define a passage fully through the mount portion.

In one form, the blade assembly is provided in combination with the support with the at least one connector and a material conveying surface against which the non-metal material on the conveying surface engaging region bears with the blade assembly in the operative position.

In one form, the mount portion has a downwardly opening receptacle for the at least one connector, as viewed along the length of the mount portion. The downwardly opening receptacle has a first height. An overall height of the mount portion is at least 50% greater than the first height.

In one form, the blade assembly has a width between oppositely facing surfaces and the first portion of the wall extends over a majority of the width of the wall.

In one form, the blade assembly has a flat bottom wall surface and the first portion of the wall extends at angle to the flat bottom wall that is in a range of 30°-55°.

In one form, the blade assembly has a flat bottom wall surface and the first portion of the wall extends at angle to the flat bottom wall surface that is in a range of 40°-50°.

DETAILED DESCRIPTION OF THE PREFERRED EMBODIMENT

Figure 1:
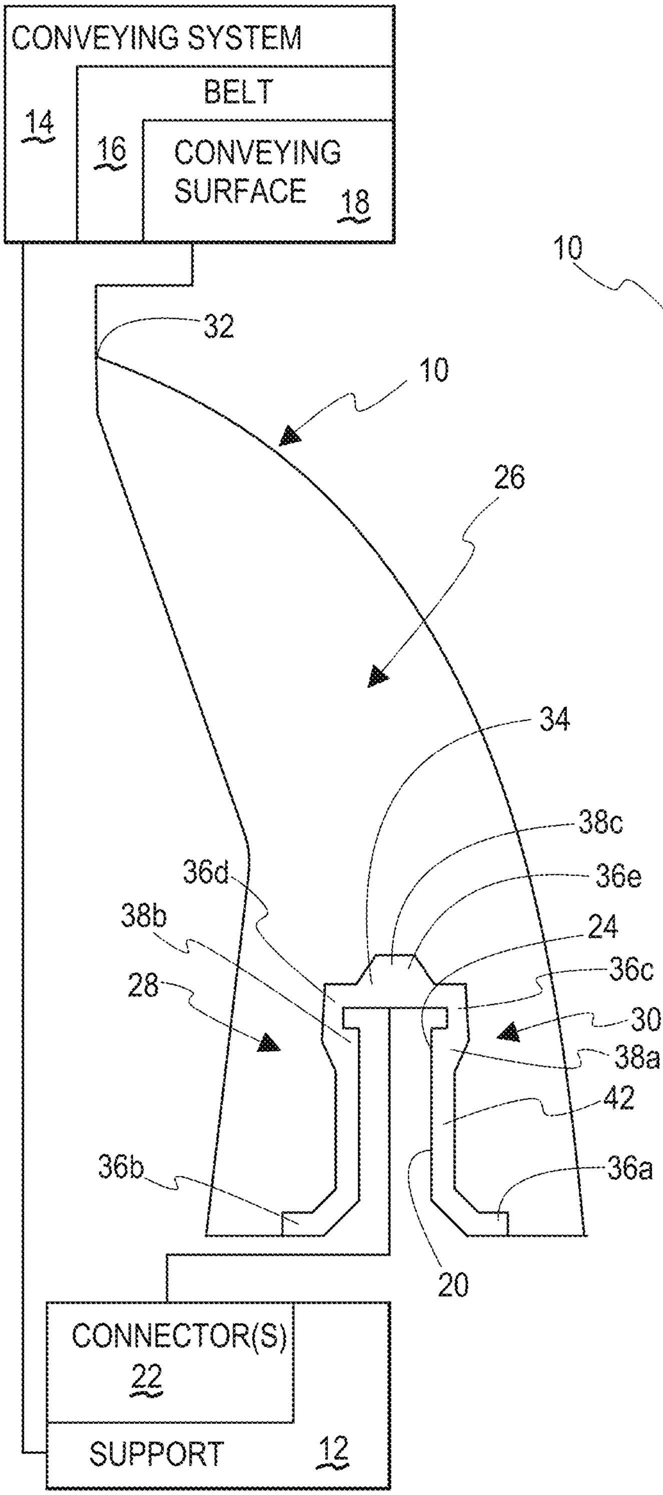
Fig. 1 (PRIOR ART)
FIG. 1 is a side elevation view of a conventional form of blade assembly with schematic depictions of a support for the blade assembly and a conveying system with a conveying surface against which the blade assembly acts.
Figure 2:
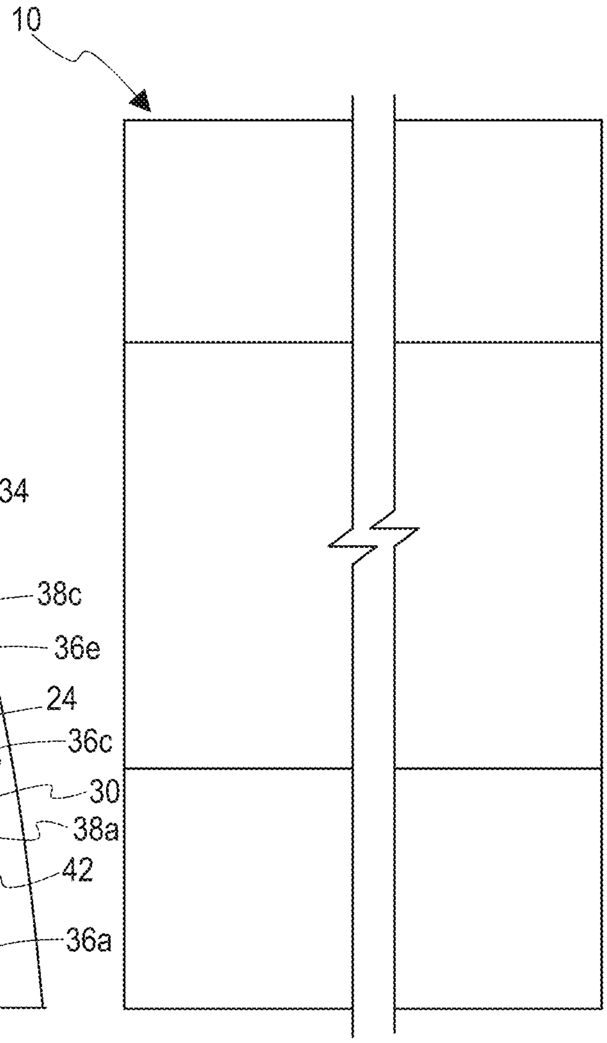
Fig. 2 (PRIOR ART)
FIG. 2 is a front elevation view of the blade assembly in FIG. 1.
Figure 4:
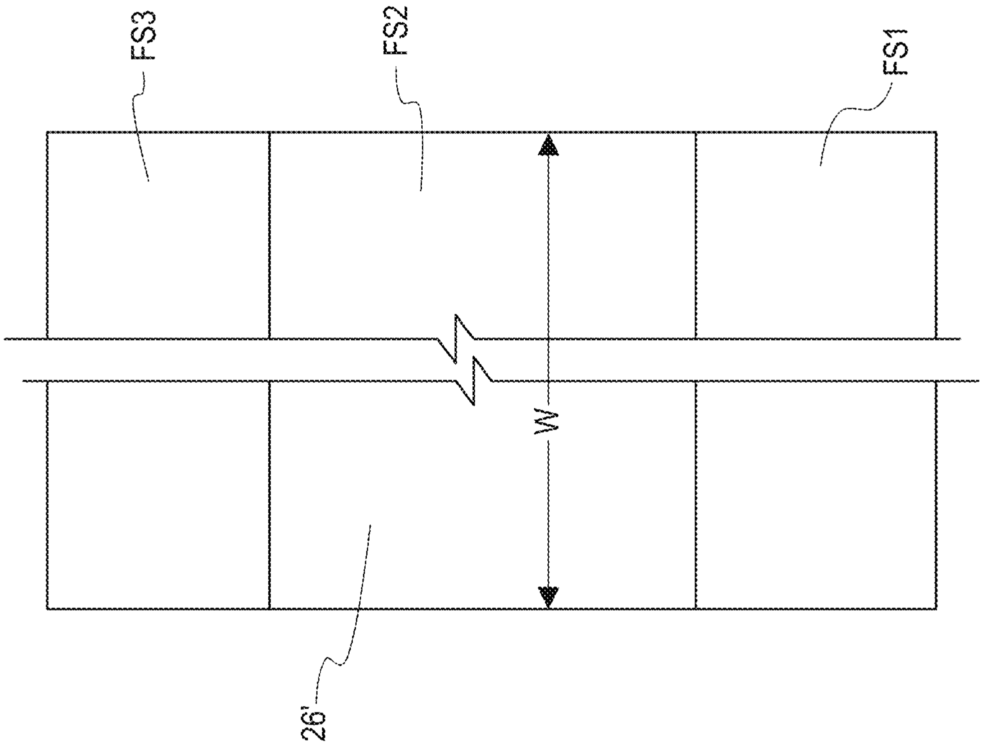
FIG. 4 is a front elevation view of the blade assembly in FIG. 3.

In FIGS. 1 and 2, a conventional blade assembly, as currently offered by the assignee herein, is shown at 10 in an operative position relative to a support 12 that is associated with a conveying system 14. The support 12 may be integrated into the conveying system 14 or may be an independent structure.

The conveying system 14 is shown in schematic form to encompass virtually an unlimited number of different forms thereof. What is significant about the conveying system 14 is that it has a moving belt 16 with a conveying surface 18 upon which material is placed to be advanced by the moving belt 16.

In one exemplary form, as shown in U.S. Pat. No. 6,056,112, the belt 16 is trained around spaced rollers to move in an endless path. The advanced material separates from the belt 16 at a discharge location at which region the blade assembly 10 is used to scrape the conveying surface 18 before the conveying surface 18 moves in the return path portion. The disclosure of U.S. Pat. No. 6,056,112 is incorporated herein by reference.

As shown in FIG. 1, the blade assembly 10 has a mount portion 20 configured to be engaged with at least one connector 22 on the support 12 with the blade assembly 10 in an operative position.

The mount portion 20 depicted is configured to define a slot 24 in which the connector 22, with a complementary shape, makes a keyed connection. This allows the mount portion 20 to be engaged with the connector 22 by aligning an end of the mount portion 20 with the connector 22 and sliding the mount portion therealong to place the blade assembly in its operative position, which may be suitably maintained.

The precise configurations of the mount portion 20 and connector 22, as well as the remainder of the support 12, are not critical to the present invention. It suffices to say that the invention contemplates that the mount portion, regardless of its precise configuration, is responsible for maintaining the blade assembly in its operative position relative to the support 12 while additionally providing stability and some level of rigidity to a conveying surface engaging region at 26 thereabove.

Typically, the mount portion 20 is made from a metal material, such as aluminum. Metal construction is not a requirement. The conveying surface engaging region at 26 is made from a non-metal material, with the compositions thereof varying from one manufacturer to the next. The assignee herein uses a urethane material for the conveying surface engaging region at 26.

The overall configuration of the blade assembly 10, including the exact shape and dimensions of the conveying surface engaging region 26, are not critical to the present invention as they can vary considerably depending upon the particular application and requirements.

Generally, and as depicted in FIG. 1, the material making up the conveying surface engaging region 26 extends to over the mount portion 20, so that the mount portion 20 is fully embedded therein and such that substantial thicknesses of the non-metal material, making up the conveying surface engaging region 26, are built up at opposite side regions 28, 30 at the mount level, as viewed along the length of the mount portion 20.

Typically, the mount portion 20 will have an extruded shape that is embedded in the non-metal material through a molding process.

Generally, this type of blade assembly, as viewed along the length thereof as in FIG. 1, has a greater thickness in the vicinity of the mount portion 20 and has a tapering curved shape towards a distal free end 32. This allows a torque to be applied through the support 12 to the mount portion 20 that resiliently urges the free end region of the blade assembly 10 against the conveying surface 18 on the belt 16.

The curved shape allows a controlled area of the conveying surface engaging region 26, made of a non-metal material, to be continuously borne against the conveying surface 18 as the non-metal material progressively wears away by abrasion over time. At some point, the wear reaches a level that the useful life of the blade assembly 10 is exceeded, whereupon replacement thereof is required.

The curvature of the depicted blade assembly 10, at one side thereof, is defined by angularly arranged flat surface portions FS1, FS2, FS3. This design is not required.

The depicted mount portion 20 has a wall 34 with discrete outward projections 36*a*, 36*b*, 36*c*, 36*d*, 36*e* and thickened regions 38*a*, 38*b*, 38*c* which facilitate bonding to the non-metal material while at the same time affording the required additional stability of the non-metal material in the vicinity of the mount portion 20.

As mentioned in the Background Art portion, above, the non-metal material, primarily above the mount portion 20, will repeatedly flex in use, which in operation tends to generate heat which alters the bending characteristics of the non-metal material. To rigidify the non-metal material and address this heat buildup and to also reduce the likelihood that the non-metal material might separate from the mount portion, it is known to provide even more intricate, discrete, embeddable shapes on the mount portion, as seen in cross-section, and to thicken the amount of the non-metal material in the regions corresponding to those at 28 and 30 in FIG. 1.

As discussed in the Background Art section above, in the event that the mount portion is to be reused once the blade assembly 10 has reached the end of its useful life, the non-metal material in which the mount portion 20 is embedded is commonly separated and disposed of. Adding more non-metal material to add stability and secure connection to the mount portion creates additional waste.

As noted above, many of the details concerning the shape of the conveying surface engaging region at 26, the interaction between the mount portion 20 and connector 22, and the details of the support 12, are not critical to the invention.

The invention is primarily concerned with the configuration of the mount portion 20', as shown in one exemplary form in FIGS. 3-6, and its relationship with the non-metal material in which it is embedded.

The mount portion 20' as shown in FIGS. 3-6, and corresponding to the mount portion 20 in FIG. 1, is integrated into a blade assembly at 10' having substantially the same external shape as the blade assembly 10. This, of course, is not a requirement.

The mount portion 20' has a body 42' made of a material different than the material making up the conveying surface engaging region at 26' and the regions 28', 30', corresponding to those same regions 28, 30 in FIGS. 1 and 2.

The material making up the regions 26', 28', 30' is a non-metal material which in one form, without limitation, is urethane. The body 42 may be any material different than the non-metal/urethane material, with one exemplary material being metal, such as aluminum.

The body 42' defines a slot 24' which has substantially the same shape as the slot 24 to cooperate with the connector(s) 22 in the same fashion. Again, this detail is not critical.

Figure 8:
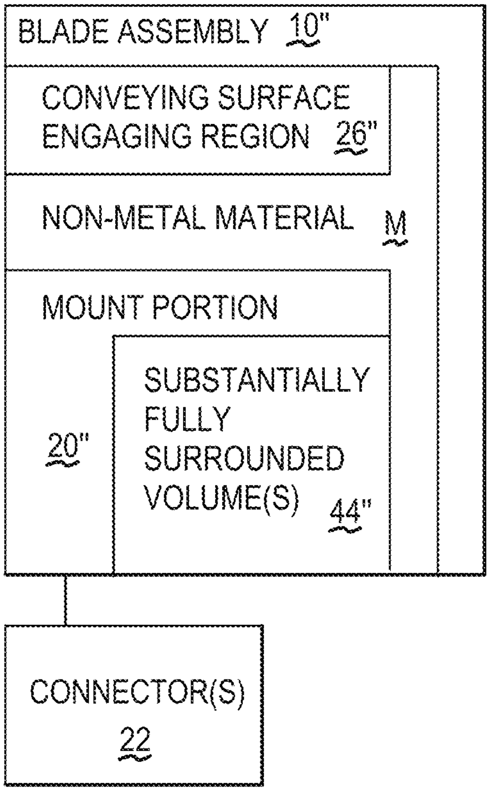
FIG. 8 is a schematic representation of a blade assembly, according to the invention.

In a generic sense, as shown in FIG. 8, the inventive blade assembly at 10" has a mount portion 20" configured to be engaged with at least one connector 22 on the support 12 to maintain the blade assembly 10" in its operative position.

The mount portion 20" is at least partially embedded in a non-metal material M defining a conveying surface engaging region 26". The mount portion 20" is made of a material different than a non-metal material making up the conveying surface engaging region 26".

The mount portion 20" has a length between spaced ends and is coextensive with a width of the conveying surface engaging region 26".

The mount portion 20" has at least a first substantially fully surrounded volume 44", as viewed along the length of the mount portion 20", that is not filled with the non-metal material M. The first substantially fully surrounded volume 44" preferably extends over at least a majority of the length of the mount portion 20" as identified at L for the corresponding portion 20' in FIG. 6.

The first substantially fully surrounded volume 44" is configured to allow airflow therewithin with the blade assembly 10" in its operative position.

Figure 9:
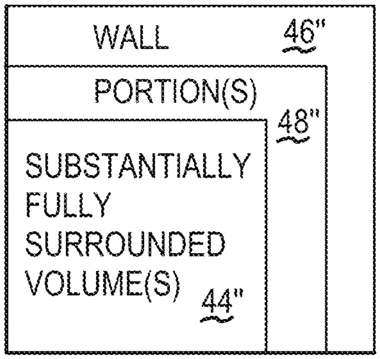
FIG. 9 is a schematic representation showing additional details of the mount portion shown schematically in FIG. 8.

As shown also schematically in FIG. 9, the substantially fully surrounded volume 44" is bounded at least in part by a wall 46" having at least one portion 48" with a substantial length as viewed along the length of the mount portion 20". The substantial length of the wall portion(s) 48" has oppositely facing surfaces, with one of the oppositely facing surfaces bounding the substantially fully surrounded volume 44", with the non-metal material M, forming the conveying surface engaging region 26" and the side regions corresponding to those at 28 and 30, formed against the other of the oppositely facing surfaces.

Referring again now to FIGS. 3-6, the body 42' defines three exemplary substantially fully surrounded volumes 44'(*a*), 44'(*b*), and 44'(*c*) outside of the slot 24'.

It should be understood that within the schematic showings in FIGS. 8 and 9, a single substantially fully surrounded volume 44" may be formed, with no limitation as to the shape—understanding that the depicted forms of the substantially fully surrounded volumes 44' are exemplary in nature only. In this case, any one or two of the volumes 44'(*a*), 44'(*b*), and 44'(*c*) may be incorporated without the other volume(s).

Further, the characterization "substantially fully surrounded" volumes is intended to encompass embodiments wherein the body 42' may be interrupted but still effectively causes a substantially fully surrounded volume/space to remain after the body 42' is mold formed with the non-metal material to produce the blade assembly shape depicted.

Further, the characterization of the wall portion(s) 48" as having a "substantial length" is intended to encompass length of at least ¼ inch, and in other embodiments at least ½ inch, and in further embodiments at least one inch or more.

Figure 3:
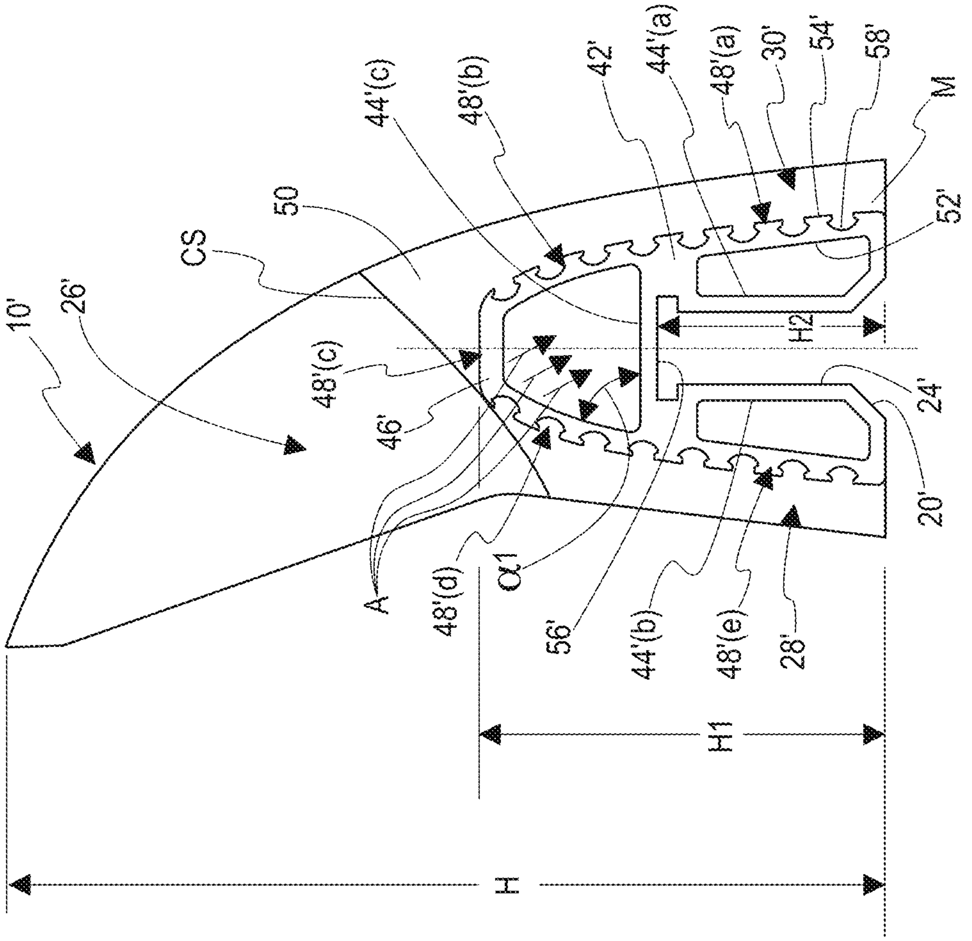
FIG. 3 is a side elevation view of a blade assembly according to the invention.
Figure 5:
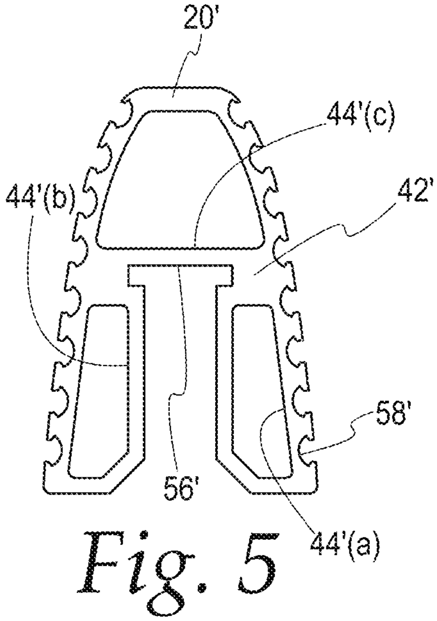
FIG. 5 is a side elevation view of a mount portion on the blade assembly in FIG. 3.
Figure 6:
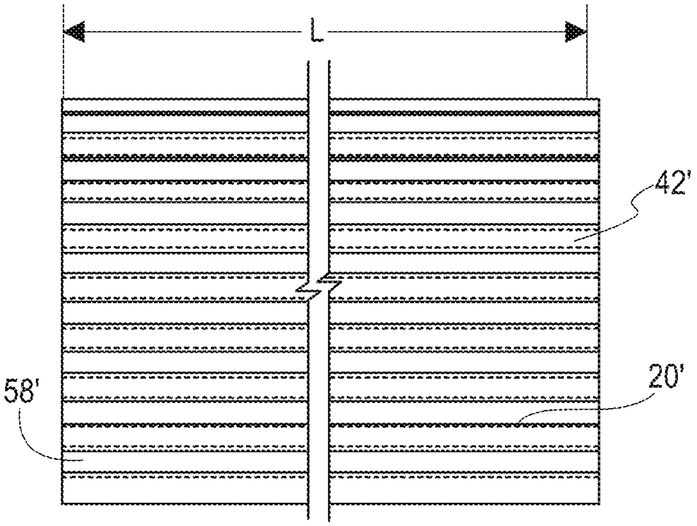
FIG. 6 is a front elevation view of the mount portion in FIG. 5.

As seen in FIG. 3, the mount portion 20' is symmetrical about a vertical reference plane 50 extending along the length L of the body 42', which is coextensive with part or all of a width W of the conveying surface engaging region 26'.

In the depicted form, the wall 46' has a first portion 48'(*a*), a second portion 48'(*b*), a third portion 48'(*c*), a fourth portion 48'(*d*), and a fifth portion 48'(*e*), each of which has oppositely facing surfaces, with one surface facing a respective substantially fully surrounded volume 44', with the non-metal material M formed against the other of the oppositely facing surfaces.

For example, the wall portion 48'(*a*) has a surface 52' facing the substantially fully surrounded volume 44'(*a*) and an oppositely facing surface 54' against which the non-metal material M is formed.

The "substantial lengths" of the wall portions 48'(*a*), 48'(*c*), and 48'(*e*) are all substantially straight, whereas the substantial lengths of the wall portions 48'(*b*) and 48'(*d*) are curved as viewed along the length of the mount portion 20'.

The substantially fully surrounded volume 44'(*c*) depicted is located entirely above a downwardly opening receptacle 56' defined by the connecting slot 24'. It is contemplated that part of the fully surrounded volume 44'(*c*) might extend to below the top of the slot 24'/downwardly opening receptacle 56'.

The fully surrounded volumes 44'(*a*), 44'(*b*) are fully spaced from the slot 24'/downwardly opening receptacle 56', to opposite sides of the slot 24'/downwardly opening receptacle 56'. It is contemplated that these side fully surrounded volumes 44' may extend to laterally coincide with the slot 24'/downwardly opening receptacle 56'.

As further depicted, the entirety of the height of each of the substantially fully surrounded volumes 44'(*a*) and 44'(*b*) resides below the top of the slot 24'/downwardly opening receptacle 56'. The fully surrounded volumes 44'(*a*), 44'(*b*) may extend up to, or to above, the top of the slot 24'/ downwardly opening receptacle 56'.

Within the schematic depictions in FIGS. 8 and 9, many different variations of the different fully surrounded volumes 44' are contemplated, with the depicted forms being exemplary in nature only. Different shapes, relative sizes, relative locations, etc. of the substantially fully surrounded volumes 44", and different relationships with the downwardly opening slot 24/downwardly opening receptacle 56 and each other are contemplated.

The surface 54' has a series of vertically spaced undercuts 58' extending along the length of the body 42' to produce an interlocking connection with the non-metal material M molded thereagainst. The undercuts 58' are spaced from each other around substantially the full exposed outer surface of the body 42'.

As depicted, the substantially fully surrounded volumes 44' are all fully surrounded—that is, without any interruption.

As depicted, during the molding process, little, and more preferably none, of the non-metal material M flows into the substantially fully surrounded volumes 44' such that it is not present in the final product.

In one preferred form, the mount portion 20' has a uniform shape along the full length thereof which can be achieved by forming the same through an extruding process. As a result, each of the substantially fully surrounded volumes 44' defines a through passage for air, which facilitates cooling in operation.

Since the cooled, non-metal material M on the blade assembly 10' is less prone to softening or melting, less buildup thereof, and reinforcement thereby, is needed around the mount location. Thus, a wider body 42' may be utilized for greater stability with less non-metal material required in the regions at 28', 30', while maintaining the overall blade assembly configuration in FIG. 1.

Further, because of this cooling feature, the body 42' may have a vertical height greater relative to the overall height of the blade assembly 10' than with the blade assembly 10. More specifically, the blade assembly 10' has a height H with the body 42 having a height H1 shown to be approximately fifty percent of the height H. The relative dimensions of the heights H, H1 are accurately depicted in FIG. 3.

On the other hand, the corresponding height of the body 42 on the blade assembly 10 is in the nature of 30-35 percent of the overall height.

As further depicted, the height of the mount portion 20' is at least 50% greater than the height of the slot 24'/downwardly opening receptacle 56'.

As noted above, by causing the mount portion 20' to occupy a greater overall volume of the blade assembly 10', the amount of non-metal material required is reduced, thereby minimizing waste without compromising performance or life expectancy for the blade assembly.

It is also contemplated that the substantially fully surrounded volumes 44' may not extend fully through the length of the mount portion 20' while still creating a cooling effect.

As noted above, while the non-metal material is described as urethane, this is only one form used by the assignee that is selected from many different alternative compositions.

The benefits of the present invention are particularly significant with larger blades which have longer moment arms and have greater torques applied to them. This tends to lead to greater deflection of the non-metal material. By replacing the non-metal material in the lower region of the blade assembly with the more rigid metal mount portion, the overall stiffness of the blade assembly is increased. This allows a user to apply more force without excessively distorting the non-metal material, which may result in better cleaning of the belt surface.

By generally cooling the non-metal material, the non-metal material is less prone to detrimental softening that may increase flexibility to a level beyond that desired. This in turn leads to more heat buildup, which causes the blades to wear out more quickly. Such heat buildup has been known to melt the non-metal material to the point that failure must be taken into consideration.

Figure 7:
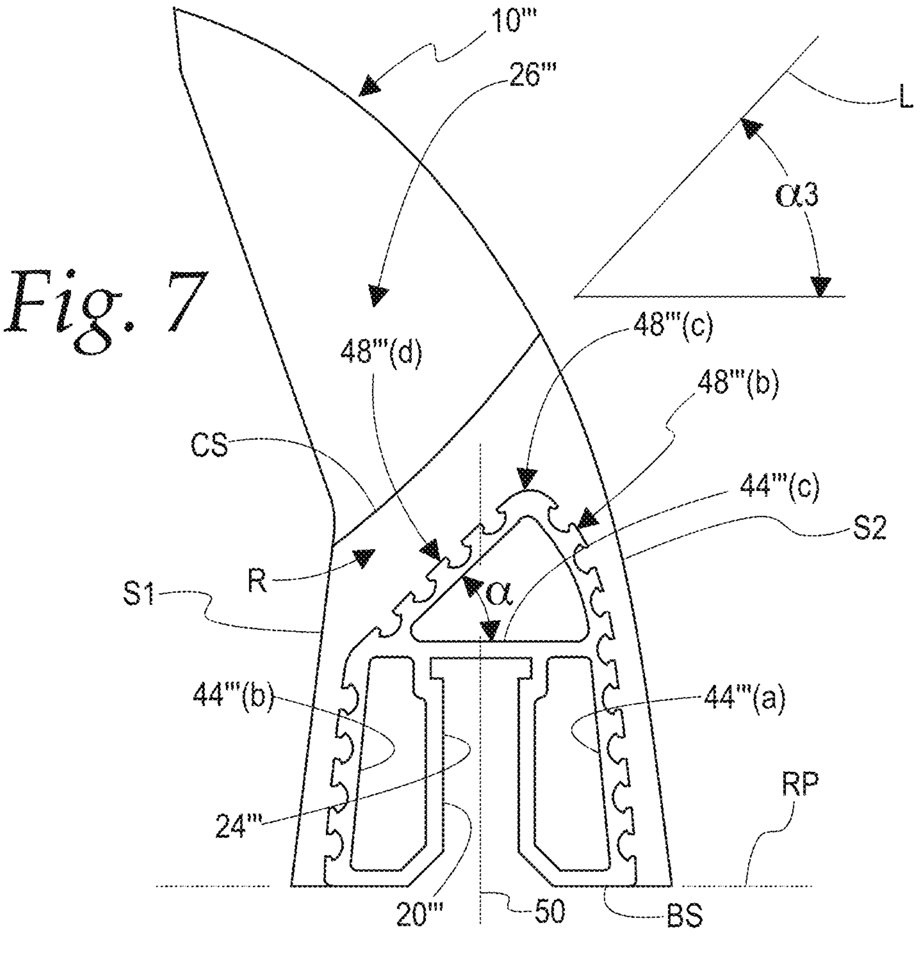
FIG. 7 is a view as in FIG. 3 of a modified form of blade assembly, according to the invention.

In FIG. 7 a modified form of blade assembly, according to the invention, is shown at 10'''. The overall blade configuration is substantially the same as for the blade 10', however this is not a requirement.

The mount portion 20''' functions substantially as the mount portion 20' and has a similar shape that differs primarily in two respects.

First, the volumes 44'''(*a*) and 44'''(*b*) extend vertically upwardly to the top of the slot 24''', whereas the volumes 44'(*a*), 44'(*b*) terminate below the top of the corresponding slot 24'.

Secondly, the wall portions 48'''(*b*), 48'''(*c*), 48'''(*d*) cooperatively have a different shape around the volume 44'''(*c*) than the corresponding wall portions 48'(*b*), 48'(*c*), 48'(*d*) have around the corresponding volume 44'(*c*). The shape of the wall portion 48'''(*d*) is such that it would result from deforming/collapsing the wall portions 48'(*c*), 48'(*d*) in the direction of the arrows A in FIG. 3 whereupon: a) the mount portion 20''' is no longer symmetrical about the axis 50 above the slot 24''' as the mount portion 20' is in FIG. 3; b) the wall portion 48'''(*d*) is longer than the wall portion 48'(*d*) and extends over a majority of the width of the blade assembly 10''' between oppositely facing surfaces S1, S2; and c) the length of the wall portion 48'''(*d*) makes an angle $\alpha$ with a horizontal plane, coinciding with the bottom surface BS, that is less than the corresponding angle $\alpha$1 in FIG. 3.

As a result, this configuration eliminates the presence of the mount portion 20''' in a region at R above the wall portion 48'''(*d*) which potentially extends the useful life of the blade assembly 10''' without appreciably lessening the structural advantages of the mount portion 20'.

More specifically, the mount portion 20''' is designed so that the non-metal conveying surface engaging region 26''' will progressively wear from its initial length down approximately to a length where the distal belt contacting region is a concave surface CS. The concave surface CS as viewed from the FIG. 7 perspective lies substantially in a line L that makes an angle $\alpha$3, with the horizontal reference plane RP that is parallel to the flat bottom surface BS of the blade assembly 10''', that is approximately equal to the angle $\alpha$. This angle $\alpha$ is preferably in the range of 30°-55° and in another preferred form in the range of 40°-55°.

Similar wear of the non-metal conveying surface engaging region 26' on the blade assembly 10' in FIG. 3 would cause the corresponding concave surface CS to intersect and thus expose the mount portion 20'. Before the metal of the mount portion 20 actually becomes exposed, the thickness of the non-metal material over a part of the mount portion 20' is reduced such that adherence of the non-metal material of the surface engaging region 26' to the mount portion 20' generally would be compromised to the point that the blade assembly 10' is no longer practically usable.

On the other hand, the additional volume of the non-metal material in the region R on the blade assembly 10''' potentially significantly extends its useful life over the otherwise similarly functioning blade assembly 10'.

The mount portion 20''' otherwise functions on the blade assembly 10''' in substantially the same way as the mount portion 20' does on the blade assembly 10'.

The foregoing disclosure of specific embodiments is intended to be illustrative of the broad concepts comprehended by the invention.

The invention claimed is:

1. A blade assembly for scraping an advancing material conveying surface, the blade assembly comprising:

a mount portion configured to be engaged with at least one connector on a support for the blade assembly to thereby maintain the blade assembly in an operative position, the mount portion at least partially embedded in a non-metal material defining a conveying surface engaging region of the blade assembly, the mount portion made of a material different than the non-metal material, the mount portion having a length between spaced ends and coextensive with a width of the conveying surface engaging region, wherein the mount portion has a first substantially fully surrounded volume, as viewed along the length of the mount portion, that is not filled with the non-metal material, the first substantially fully surrounded volume extending over a majority of the length of the mount portion, the mount portion and first substantially fully surrounded volume configured to allow external air to flow in a lengthwise direction relative to the mount portion into the first substantially fully surrounded volume and within the first substantially fully surrounded volume with the blade assembly in the operative position.

2. The blade assembly for scraping an advancing material conveying surface according to claim 1 wherein the first substantially fully surrounded volume is bounded at least in part by a wall having a first portion with a substantial length as viewed along the length of the mount portion, wherein the substantial length of the first wall portion has oppositely facing surfaces with one of the oppositely facing surfaces bounding the substantially fully surrounded volume and the non-metal material formed against the other of the oppositely facing surfaces.

3. The blade assembly for scraping an advancing material conveying surface according to claim 2 wherein the substantial length of the first wall portion is substantially straight as viewed along the length of the mount portion.

4. The blade assembly for scraping an advancing material conveying surface according to claim 2 wherein the substantial length of the first wall portion is curved as viewed along the length of the mount portion.

5. The blade assembly for scraping an advancing material conveying surface according to claim 1 wherein the mount portion has a downwardly opening receptacle for the at least one connector on the support and the first substantially fully surrounded volume extends to above the downwardly opening receptacle.

6. The blade assembly for scraping an advancing material conveying surface according to claim 5 wherein the first substantially fully surrounded volume is located entirely above the downwardly opening receptacle.

7. The blade assembly for scraping an advancing material conveying surface according to claim 1 wherein the mount portion has a second substantially fully surrounded volume, as viewed along the length of the mount portion.

8. A blade assembly for scraping an advancing material conveying surface, the blade assembly comprising:

a mount portion configured to be engaged with at least one connector on a support for the blade assembly to thereby maintain the blade assembly in an operative position, the mount portion at least partially embedded in a non-metal material defining a conveying surface engaging region of the blade assembly, the mount portion made of a material different than the non-metal material, the mount portion having a length between spaced ends and coextensive with a width of the conveying surface engaging region, wherein the mount portion has a first substantially fully surrounded volume, as viewed along the length of the mount portion, that is not filled with the non-metal material, the first substantially fully surrounded volume extending over a majority of the length of the mount portion, the first substantially fully surrounded volume configured to allow air flow therewithin with the blade assembly in the operative position, wherein the mount portion has a second substantially fully surrounded volume, as viewed along the length of the mount portion, wherein the mount portion has a downwardly opening receptacle for the at least one connector on the support and the second substantially fully surrounded volume is spaced at least partially to a first side of the downwardly opening receptacle as viewed along the length of the mount portion.

9. A blade assembly for scraping an advancing material conveying surface, the blade assembly comprising:

a mount portion configured to be engaged with at least one connector on a support for the blade assembly to thereby maintain the blade assembly in an operative position, the mount portion at least partially embedded in a non-metal material defining a conveying surface engaging region of the blade assembly, the mount portion made of a material different than the non-metal material, the mount portion having a length between spaced ends and coextensive with a width of the conveying surface engaging region, wherein the mount portion has a first substantially fully surrounded volume, as viewed along the length of the mount portion, that is not filled with the non-metal material, the first substantially fully surrounded volume extending over a majority of the length of the mount portion, the first substantially fully surrounded volume configured to allow air flow therewithin with the blade assembly in the operative position, wherein the mount portion has a second substantially fully surrounded volume, as viewed along the length of the mount portion, wherein the mount portion has a downwardly opening receptacle for the at least one connector on the support and an entirety of the second substantially fully surrounded volume is spaced to a side of the downwardly opening receptacle as viewed along the length of the mount portion.

10. A blade assembly for scraping an advancing material conveying surface, the blade assembly comprising:

a mount portion configured to be engaged with at least one connector on a support for the blade assembly to thereby maintain the blade assembly in an operative position, the mount portion at least partially embedded in a non-metal material defining a conveying surface engaging region of the blade assembly, the mount portion made of a material different than the non-metal material, the mount portion having a length between spaced ends and coextensive with a width of the conveying surface engaging region, wherein the mount portion has a first substantially fully surrounded volume, as viewed along the length of the mount portion, that is not filled with the non-metal material, the first substantially fully surrounded volume extending over a majority of the length of the mount portion, the first substantially fully surrounded volume configured to allow air flow therewithin with the blade assembly in the operative position, wherein the mount portion has a second substantially fully surrounded volume, as viewed along the length of the mount portion, wherein the mount portion has a downwardly opening receptacle for the at least one connector on the support and a majority of a height of the second substantially fully surrounded volume, as viewed along the length of the mount portion, resides below a top of the downwardly opening receptacle.

11. The blade assembly for scraping an advancing material conveying surface according to claim 8 wherein the mount portion has a third substantially fully surrounded volume spaced to a side of the downwardly opening receptacle opposite to the first side of the downwardly opening receptacle.

12. The blade assembly for scraping an advancing material conveying surface according to claim 1 wherein the material from which the mount portion is made is metal.

13. The blade assembly for scraping an advancing material conveying surface according to claim 1 wherein the first substantially fully surrounded volume is a first fully surrounded volume.

14. The blade assembly for scraping an advancing material conveying surface according to claim 1 wherein the non-metal material is not present in the first fully surrounded volume.

15. The blade assembly for scraping an advancing material conveying surface according to claim 13 wherein the first fully surrounded volume is fully surrounded by a surface made from the material from which the mount portion is made, wherein the material from which the mount portion is made is metal.

16. The blade assembly for scraping an advancing material conveying surface according to claim 1 wherein the mount portion has a constant shape fully between the spaced ends of the mount portion as viewed along the length of the mount portion.

17. The blade assembly for scraping an advancing material conveying surface according to claim 1 wherein the non-metal material defining the conveying surface engaging region comprises urethane.

18. The blade assembly for scraping an advancing material conveying surface according to claim 1 wherein the first substantially fully surrounded volume extends fully between the spaced ends of the mount portion so as to define a passage fully through the mount portion.

19. The blade assembly for scraping an advancing material conveying surface according to claim 1 in combination with the support with the at least one connector and a material conveying surface against which the non-metal material on the conveying surface engaging region bears with the blade assembly in the operative position.

20. The blade assembly for scraping an advancing material conveying surface according to claim 1 wherein the mount portion has a downwardly opening receptacle for the at least one connector, as viewed along the length of the mount portion, the downwardly opening receptacle has a first height, and an overall height of the mount portion is at least 50% greater than the first height.

21. The blade assembly for scraping an advancing material conveying surface according to claim 2 wherein the blade assembly has a width between oppositely facing surfaces and the first portion of the wall extends over a majority of the width of the wall.

22. The blade assembly for scraping an advancing material conveying surface according to claim 21 wherein the blade assembly has a flat bottom wall surface and the first portion of the wall extends at angle to the flat bottom wall that is in a range of 30°-55°.

23. The blade assembly for scraping an advancing material conveying surface according to claim 21 wherein the blade assembly has a flat bottom wall surface and the first portion of the wall extends at angle to the flat bottom wall surface that is in a range of 40°-50°.

24. The combination according to claim 19 wherein with the blade assembly in the operative position, the mount portion is configured to allow external air to flow through one of the spaced ends of the mount portion and into the first substantially fully surrounded volume.

* * * * *